Jan. 16, 1940.                    J. ZERNIKE                    2,187,638

STORAGE BATTERY

Filed June 26, 1937

INVENTOR
J. Zernike
BY
ATTORNEY

Patented Jan. 16, 1940

2,187,638

UNITED STATES PATENT OFFICE 2,187,638

STORAGE BATTERY

Johannes Zernike, Eindhoven, Netherlands, assignor to N. V. Philips' Gloeilampenfabrieken, Eindhoven, Netherlands Application June 26, 1937, Serial No. 150,626
In Germany July 13, 1936

2 Claims. (Cl. 136—11)

My invention relates to electric storage batteries, particularly multi-cell low-capacity storage batteries using bipolar plates.

The term "bipolar plates" is to be understood to mean plates which serve as a partition between adjacent cells, and have one surface acting as the negative plate of one cell and the opposite surface acting as the positive plate of the adjacent cell.

Batteries of this type have been described in detail in the British Patent #439,917, in which the bipolar plates comprise graphite or a mixture of graphite and a non-conductive material such as artificial resin, whereas the electrolyte consists of one or more soluble lead salts.

In the manufacture of such batteries, considerable difficulty arises in securing a liquid-tight construction; i. e. arranging the bipolar plates so that there will be no communication between the cells around the edges of the bipolar plates.

The object of my invention is to overcome the above difficulties, and for this purpose I form the plates from a mixture of graphite and rubber, and cast asphalt or a similar substance to form a container in which marginal portions of the plates are liquid-tightly embedded.

I prefer to form the plates from rubber which, during calendering, has had sufficient graphite added to give it the required conductivity.

To assist in obtaining a good seal at the edge portions of the plates, I prefer to provide the plates prior to casting of the condenser, with a ridge or flange of asphalt.

In order that the invention may be clearly understood and readily carried into effect, I shall describe the same in more detail with reference to the accompanying drawing, in which.

Figures 1, 2:
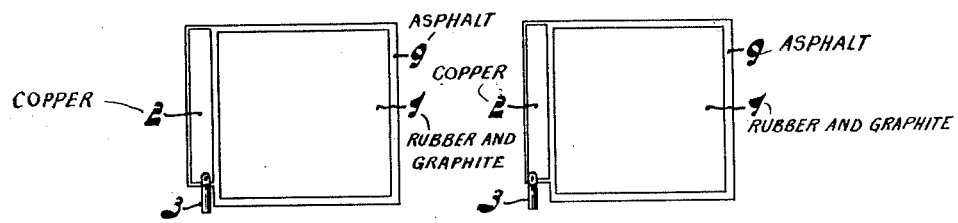
Figures 1 and 2 are side views of bipolar plates according to the invention.

The plate shown in Figure 1 comprises a sheet 1 of rubber and graphite having a thickness of about ½ mm., and made from rubber to which graphite has been added during calendering, for instance about 4–5 parts of powdered graphite to one part of rubber. Secured to the edge of the plate, for instance with lacquer, is a thin strip 2 of copper, whereas a terminal 3 is riveted to strip 2 and sheet 1. The terminal 3 is slotted at one end so as to fit over the plate, and is made tubular at its other end to receive a connecting plug.

Forming a marginal portion about 3 mms. wide around the edges of the plate and at both sides thereof, is a coating 9 of asphalt, which may be formed by applying a solution of asphalt in benzene.

The plate shown in Fig. 2 is the same as that of Fig. 1 with the exception that the terminal 3 is located nearer the edge.

Figure 3:
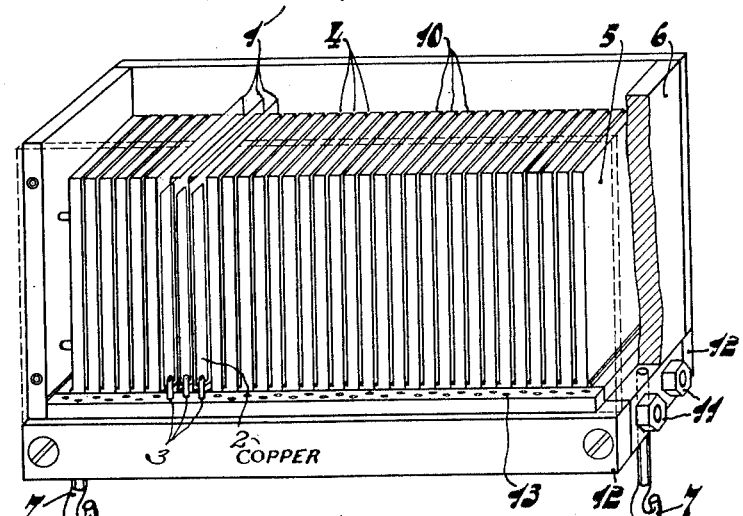
Fig. 3 is a partly-sectionized perspective view of a mold for making the battery according to the invention.

The plates are then inserted in the mold shown in Fig. 3 and comprising a casing 6 (the front side being indicated by dotted lines) having a core 5. Core 5 comprises a plurality of metal members 10 secured together by bolts 11 and forming a plurality of slots 4 which are closed at the bottom, and two members 12 one of which is provided with a plurality of holes 13 for receiving the terminals 3.

The plates shown in Figs. 1 and 2 are disposed in the slots 4 with the terminals 3 inserted in the holes 13. Liquid asphalt is then poured into the mold to fill the residual hollow spaces and to form a top layer. The mold is then flamed off and chilled. Core 5 is then removed by turning screws 7 bearing upon the side portion of the mold, after which the sides of the mold are removed.

Figure 4:
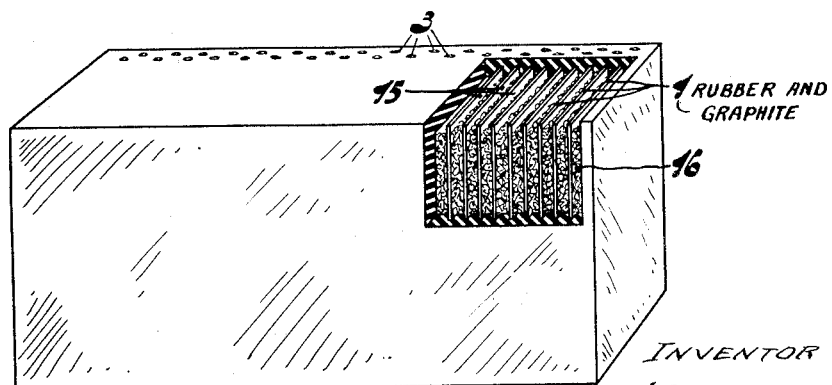
Fig. 4 is a partly-sectionized perspective view of a completed battery according to the invention.

The battery is then provided with an electrolyte and for this purpose, as indicated in Fig. 4, the spaces 15 between the plates are filled with a suitable porous material 16, such as cotton wadding, glass wool or the like, which is soaked with a solution of one or more soluble lead salts, for instance lead silicium fluoride, lead fluoborate, or the like.

If the battery is provided with lead fluosilicate and then charged, lead peroxide will be deposited on one side of each plate, acting as an anode, and lead will be deposited on the other side of each plate, acting as a cathode. This action takes place in accordance with the following formula and is reversible during the discharging:

A layer of asphalt is then cast upon the top to enclose and complete the battery ready for charging. Such batteries are rechargeable, simple, and inexpensive to manufacture, which makes them particularly suitable as "B" batteries for radio work.

What I claim is:

1. A secondary electric battery comprising a cast container of asphalt, a plurality of plates comprising a mixture of graphite and rubber and having marginal portions cast into the container to form liquid tight compartments, the surface portions of the plates bounding the compartments being adapted to receive active material to make the plates bipolar, and an electrolyte of a soluble lead salt within said compartments.

2. A secondary electric battery comprising a cast container of asphalt, a plurality of plates comprising a mixture of graphite and rubber, said plates having marginal portions cast into the container to form liquid-tight compartments, the surface portions of the plates bounding the compartments being adapted to receive active material to make the plates bipolar, absorbent material within said compartment, and an electrolyte carried by said material and comprising a soluble lead salt.

JOHANNES ZERNIKE.